(12) United States Patent
Keeler

(10) Patent No.: US 9,990,134 B2
(45) Date of Patent: Jun. 5, 2018

(54) COMMAND TUNNELING IN A HYBRID DATA STORAGE DEVICE

(71) Applicant: Seagate Technology LLC, Cupertino, CA (US)

(72) Inventor: Stanton M. Keeler, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/183,200

(22) Filed: Jun. 15, 2016

(65) Prior Publication Data

US 2017/0364272 A1    Dec. 21, 2017

(51) Int. Cl.
*G06F 3/06* (2006.01)
*G06F 12/0873* (2016.01)

(52) U.S. Cl.
CPC ............ *G06F 3/0605* (2013.01); *G06F 3/061* (2013.01); *G06F 3/068* (2013.01); *G06F 3/0634* (2013.01); *G06F 3/0635* (2013.01); *G06F 3/0659* (2013.01); *G06F 12/0873* (2013.01); *G06F 2212/217* (2013.01); *G06F 2212/313* (2013.01)

(58) Field of Classification Search
CPC ... G06F 3/068; G06F 3/0685; G06F 2212/217
See application file for complete search history.

(56) References Cited

U.S. PATENT DOCUMENTS

| | | | |
|---|---|---|---|
| 6,438,672 B1 * | 8/2002 | Fischer | G06F 12/0638 711/202 |
| 8,639,872 B1 | 1/2014 | Boyle et al. | |
| 8,661,194 B2 | 2/2014 | Nam | |
| 9,009,393 B1 | 4/2015 | Sutardja | |
| 2004/0148460 A1 * | 7/2004 | Steinmetz | G06F 3/0607 711/114 |
| 2007/0050571 A1 * | 3/2007 | Nakamura | G06F 3/0626 711/154 |
| 2007/0288692 A1 * | 12/2007 | Bruce | G06F 3/061 711/113 |
| 2010/0088459 A1 | 4/2010 | Arya et al. | |
| 2011/0179219 A1 | 7/2011 | Ma et al. | |
| 2014/0207996 A1 | 7/2014 | Fisher et al. | |
| 2016/0124877 A1 * | 5/2016 | Hefty | G06F 13/28 710/308 |

* cited by examiner

*Primary Examiner* — Nicholas Simonetti
(74) *Attorney, Agent, or Firm* — Hall Estill Attorneys at Law

(57) ABSTRACT

Apparatus and method for managing data in a hybrid data storage device. In some embodiments, a hybrid device has a hard disc drive (HDD) controller circuit coupled to non-volatile rotatable media and a solid state drive (SSD) controller circuit coupled to non-volatile solid state memory. A top level controller circuit directs a selected access command one of the HDD controller circuit or the SSD controller circuit responsive to a selected parameter associated with the selected access command. In a normal mode, the top level controller circuit directs a transfer of data between the host and the HDD controller circuit and handles host interface communications. In a tunneling mode, the top level controller circuit directly connects the HDD controller circuit to the host device. In this way, tunnel mode bypasses processing operations required by the top level controller circuit. Tunnel mode and normal mode may be selected on a command-by-command basis.

20 Claims, 5 Drawing Sheets

ROTATABLE MEDIA STORAGE SUBSYSTEM

SOLID STATE (FLASH) MEDIA STORAGE SUBSYSTEM

NORMAL MODE DATA FLOW

TUNNEL MODE DATA FLOW

COMMAND TUNNELING IN A HYBRID DATA STORAGE DEVICE

SUMMARY

Various embodiments of the present disclosure are generally directed to a hybrid data storage device that has multiple forms of media and which employs selective command tunneling.

In some embodiments, a hybrid device has a hard disc drive (HDD) controller circuit coupled to non-volatile rotatable media and a solid state drive (SSD) controller circuit coupled to non-volatile solid state memory. A top level controller circuit directs a selected access command to one of the HDD controller circuit or the SSD controller circuit responsive to a selected parameter associated with the selected access command. In a normal mode, the top level controller circuit directs a transfer of data between the host and the HDD controller circuit. In a tunneling mode, the top level controller circuit directly connects the HDD controller circuit to the host device.

In other embodiments, a hybrid device has a rotatable media subsystem comprising a rotatable magnetic recording disc, a data read/write transducer movable with respect to the rotatable magnetic recording disc, a read/write channel circuit coupled to the data read/write transducer to process data signals during write and read operations, and a servo control circuit configured to position the data read/write transducer relative to data tracks defined on a recording surface of the magnetic recording disc. A flash memory subsystem has an array of erasable flash memory cells arranged into erasure blocks, a read/write/erasure control circuit configured to read, write and erase selected flash memory cells, and a local buffer memory configured to temporarily store user data during read, write and erasure operations. A hard disc drive (HDD) controller circuit is coupled to the rotatable media subsystem, and a solid state drive (SSD) controller circuit is coupled to the flash memory subsystem. A volatile memory is coupled to the HDD and SSD controller circuits to respectively cache data associated with the rotatable median and the solid state memory. A top level controller circuit is operably coupled to an interface connector of the hybrid data storage device and is configured to direct a selected access command received from a host device through the interface connector to a selected one of the HDD controller circuit or the SSD controller circuit responsive to a selected parameter associated with the selected access command. The top level controller circuit is operative in a normal mode to coordinate a transfer of data between the host and the HDD controller circuit responsive to the selected access command. The top level controller is further operative in a tunneling mode to connect the HDD controller circuit directly to the host device without intervention by the top level controller to transfer data between the host device and the HDD controller circuit responsive to the selected access command. The top level controller circuit toggles between the normal mode and the tunneling mode responsive to the selected parameter associated with the selected access command.

In further embodiments, a method includes steps of receiving an access command to access data in a hybrid data storage device comprising non-volatile rotatable media and non-volatile solid state media; using a top level controller circuit to evaluate the access command for servicing therefrom by a hard disc drive (HDD) controller circuit coupled to the non-volatile rotatable media or a solid state drive (SSD) controller circuit coupled to the non-volatile solid state memory; selecting one of a normal mode of operation or a tunnel mode of operation for the servicing of the access command responsive to a selected parameter associated with the access command, where during the normal mode the top level controller circuit operates to coordinate a transfer of data between the host and the HDD controller circuit responsive to the selected access command, and during the tunnel mode the top level controller connects the HDD controller circuit directly to the host device without intervention by the top level controller to transfer data between the host device and the HDD controller circuit responsive to the selected access command; and servicing the access command responsive to the selected one of the normal mode or tunnel mode of operation to transfer data between the host device.

These and other features and aspects of various embodiments of the present disclosure can be understood upon a review of the following detailed description in conjunction with the associated drawings.

DETAILED DESCRIPTION

Figure 1:
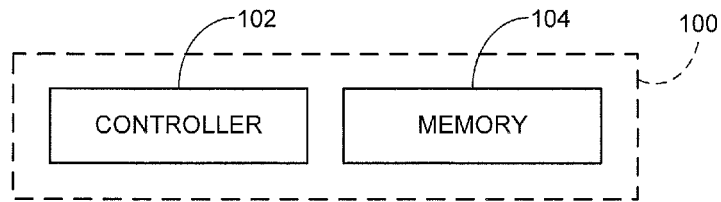
FIG. 1 is a block diagram for a data storage device characterized as a hybrid storage device in accordance with various embodiments.

The present disclosure generally relates to data storage systems, and more particularly to selective command tunneling in a hybrid data storage device.

Data storage devices operate to store and retrieve computerized user data in a fast and efficient manner. Data storage devices can utilize a variety of different types of storage media, including rotatable recording discs of the type commonly used in hard disc drives (HDDs) and solid state semiconductor memory of the type commonly used in solid state drives (SSDs).

So-called hybrid data storage devices utilize two or more distinct forms of non-volatile storage media to store user data. Some forms of hybrid data storage devices (HDSDs, also sometimes referred to as solid state hybrid drives, or SSHDs) utilize a main memory formed from rotatable magnetic recording media (e.g., magnetic discs) and a smaller auxiliary memory formed from solid state (e.g., flash) memory cells. Both forms of storage media provide a combined non-volatile storage space to store user data transferred to the device from a host.

It is common to operate a hybrid device in such a way that high priority data tend to be stored in the solid state memory since such memory tends to provide faster data transfer rates as compared to the relatively slower rotatable media. At the same time, solid state memory tends to be significantly more expensive than rotatable media.

Hybrid devices are thus designed to combine the benefits of low cost mass storage afforded by rotatable magnetic recording media with the faster transfer rate performance provided by solid state memory (e.g., flash). Ideally, hybrid devices should provide faster overall transfer rate performance that conventional HDDs and should be significantly less expensive than SSDs.

The ratio of solid state memory to rotatable storage in a hybrid device can vary, but usually the amount of storage capacity provided by the solid state memory is on the order of about 1-2% of the size of the rotatable media. Other relative values and ratios can be used as desired.

While hybrid devices have been found operable in providing enhancements in the overall data transfer capacity of a storage device as compared to an HDD, there are a number of limitations that have been found to be unique to hybrid devices that are not easily resolved. It is well established that current generation SSDs can sustain significant data transfer rates, such as on the order of 400 megabytes (MB, $10^9$ bytes) per second (MB/s) or more. Depending on a number of factors, rotatable disc HDDs can sustain data transfer rates that are perhaps 10-15% of an SSD.

It might be expected that hybrid drives would provide significantly better transfer rate performance than HDDs due to the inclusion of the solid state memory which, if properly managed, should result in significant increases in the overall data rate for the device. After all, the solid state memory in a hybrid device will tend to have native transfer rates consonant with those of SSDs, and the most active data sets will be maintained in the solid state memory of the hybrid device.

Conventional wisdom would further suggest that increasing the ratio of the solid state memory in a hybrid device, such as to 20-25% or more of the native disc capacity, would tend to further enhance the overall data transfer rate of the hybrid device. In practice, this has not generally been the case.

One limitation associated with hybrid devices is that, as noted above, the faster solid state memory only constitutes a small proportion of the overall total storage capacity of the device. Thus, unlike an SSD where all data stored by the device will be resident in the solid state memory, only a small portion of the available data will be stored in the solid state memory in a hybrid device, and this data will change over time. There is accordingly a large processing overhead required to identify, track and manage the data stored in the solid state memory. Increasing the size of the solid state memory would increase this overhead processing burden and could potentially result in a slower overall transfer rate.

Another unique property associated with most hybrid devices is that all data sets received by a hybrid device will be stored by the rotatable media. Even if data are initially stored in the flash memory, a backup copy will be written to disc. Thus, while performance and data integrity advantages can be gained by quickly caching input data to the flash, these advantages are offset by the need for a second, internal data transfer at some point to transfer the data from the flash to the disc, which can decrease the overall observed host data transfer rate. It has been found that, depending on the configuration of a given hybrid drive, overall sustainable data transfer rates may not be significantly higher than those obtained by a pure HDD of equal capacity.

Yet another factor that can affect hybrid device processing efficiency is the use of a central controller circuit to manage both disc and flash transfers. Should an exception condition arise that causes a temporary lockup condition in the disc, an internal recovery operation may be required to resolve the error before further processing can continue. In such cases, all data transfers, including transfers involving the flash memory, may be temporarily suspended.

Accordingly, various embodiments of the present disclosure are generally directed to an apparatus and method for operating a hybrid data storage device (HDSD) in such a way that overcomes these and other limitations associated with the existing art.

As explained below, some embodiments provide a hybrid device with a hard disc drive (HDD) controller circuit that is coupled to non-volatile rotatable storage media (such as a magnetic disc). The hybrid device further has a solid state drive (SSD) controller circuit coupled to non-volatile solid state memory (such as flash). A volatile memory (such as DRAM) is respectively coupled to the HDD and SSD controller circuits to cache data during transfers associated with the rotatable storage media and with the solid state memory.

A top level controller circuit is operably coupled to an interface connector of the hybrid device. Generally, the top level controller directs various access commands received from a host to the HDD and SSD controllers; for data to be stored to disc, the top level controller passes the associated access commands to the HDD controller. For data to be stored to flash, the top level controller passes the associated access commands to the SSD controller. The HDD and SSD controllers process the received access commands to transfer the associated data between the DRAM and the disc and flash, respectively. These actions can be carried out concurrently and independently along dual parallel data paths.

The top level controller operates in two primary modes: a normal mode and a tunnel mode. During normal mode, commands for disc storage and retrieval are forwarded to the HDD controller by the top level controller. Interrupts for command attention are generated and issued by the top level controller to the HDD controller, and the HDD controller operates to notify the top level controller when various status and command complete actions are accomplished. The top level controller emulates host operability such that the HDD controller "thinks" it is connected directly to, and is communicating directly with, the host device. The HDD controller has no direct contact or interaction with the SSD controller and therefore can be thought of as not being "aware" that local flash memory is on board the device.

During tunnel mode, the top level controller changes the connection of the HDD controller to the interface such that, for selected commands, the HDD controller is directly connected to the host device. Such "tunneling" bypasses the normal emulation and control functions carried out by the top level controller so that such commands can be offloaded from the top level controller and handled directly by the HDD controller. Tunnel mode can be suitable for certain types of access commands such as streamed (logically sequential) read and write commands of relatively large blocks of data, etc. The transition between normal mode and tunnel mode (and back) is seamless since, from the operational point of view of the HDD controller, it is the only controller on board the device.

In this way, data transfers can take place in parallel with both the rotatable media and the solid state media operating concurrently to service various commands. Overhead processing requirements associated with the solid state media are not handled by the HDD controller circuit as in some hybrid devices of the existing art. Lockup conditions associated with the disc media do not impact the ability of the device to continue to operate using the flash.

These and other features and advantages of various embodiments can be understood beginning with a review of FIG. 1 which shows an exemplary data storage device 100. The data storage device 100 includes a controller 102 and a memory 104. The controller 102 is a control circuit that provides top level control functionality for the storage device, and may be realized in hardware, software and/or firmware. For example, the controller circuit may constitute one or more programmable processors having associated programming instructions stored in a memory which, when executed, cause the processor(s) to carry out various control functions as explained herein. Other forms of controller circuit can be utilized, such as hardware circuits, programmable gate arrays, logic networks, application specific integrated circuits (ASICs), system on chip (SOC) devices, etc. As will be recognized, these and other forms of controller circuits may be formed of various logic, storage and switching elements using semiconductor fabrication techniques.

The memory 104 provides non-volatile memory storage for user data transferred to the storage device by a host device. The memory may incorporate a number of different types of non-volatile storage such as solid-state memory (e.g., flash), rotatable storage media, etc. For purposes of the present illustrative example, the device 100 is contemplated as comprising a hybrid data storage device (HDSD) so that the memory 104 includes both rotatable storage media and solid state semiconductor memory. While not limiting, the rotatable media are contemplated as magnetic recording media and the solid state memory is contemplated as flash memory. Other arrangements can be used.

Figure 2:
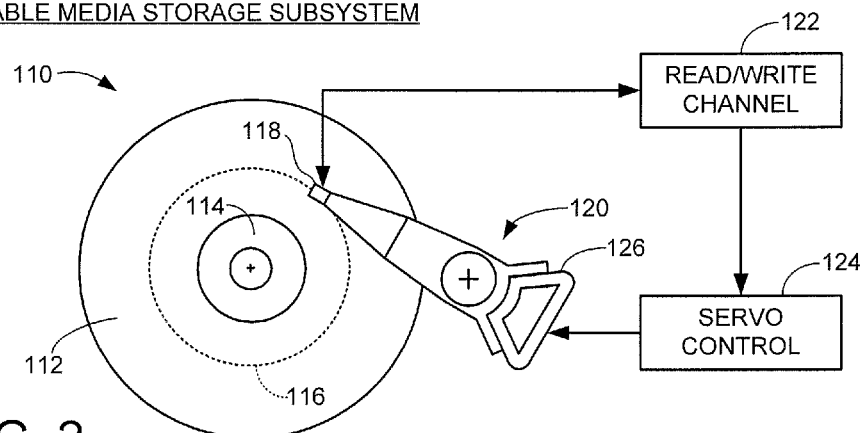
FIG. 2 is an isometric depiction of a rotatable media storage subsystem of the hybrid storage device of FIG. 1 constructed and operated in accordance with some embodiments.

FIG. 2 shows a rotatable media storage subsystem 110 of the memory 104 of FIG. 1 in accordance with some embodiments. The subsystem 110, also sometimes variously referred to as rotatable media or the disc, constitutes aspects of a hard disc drive (HDD) storage system. Various other elements may be incorporated into the subsystem so the diagram is illustrative and not limiting.

One or more rotatable magnetic recording discs 112 are fixed for rotation about a central axis of a spindle motor 114. A number of concentric tracks 116 are arranged on each of the disc surfaces and accessed by a data read/write transducer (head) 118.

Each head 118 is moved across the surface of the disc using a rotary actuator 120. A read/write (R/W) channel circuit 122 provides write currents to and receives transduced readback signals from each head during respective write and read operations. A servo control circuit 124 provides closed loop positional control of the position of the heads 118 using embedded servo data (not separately shown) from the disc surfaces. The servo circuit 124 applies current to a coil 126 of a voice coil motor (VCM) to adjust the position of a selected head accordingly.

Figure 3:
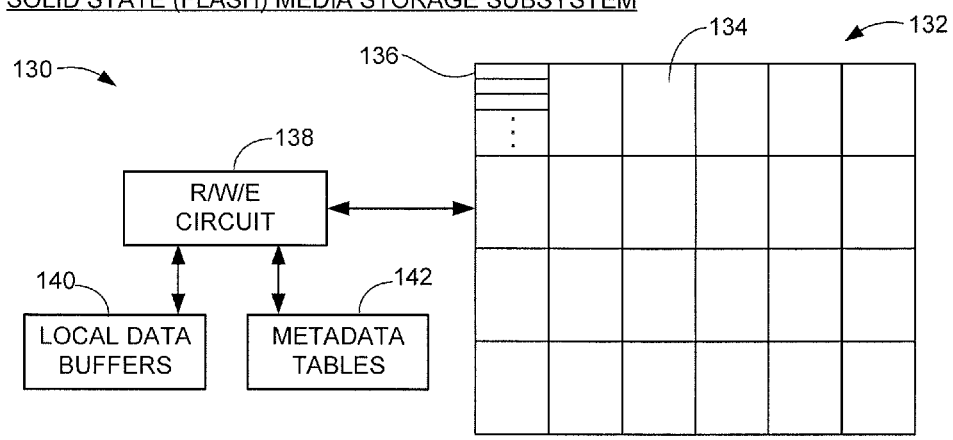
FIG. 3 is an isometric depiction of a solid state (flash) media storage subsystem of the hybrid storage device of FIG. 1 constructed and operated in accordance with some embodiments.

FIG. 3 shows a solid state media storage subsystem 130 of the memory 104 of FIG. 1 in accordance with some embodiments. The subsystem 130 is also sometimes referred to as solid state media or the flash, and is generally arranged as aspects of a solid state drive (SSD) storage system. Various other elements may be incorporated into the subsystem so the diagram is illustrative and not limiting.

The solid state media 130 includes a flash array 132 of flash memory cells arranged into rows and columns. The flash cells are grouped into erasure blocks 134, constituting a smallest unit of the flash array that can be erased as a unit. Each erasure block 134 is formed from individual pages (row) 136 of memory cells to which fixed sized blocks of data may be written.

A read/write/erase (R/W/E) circuit 138 directs data transfers to and from the respective pages 136, and performs data migrations and erasures during garbage collection operations. A number of local data buffers 140 in the form of volatile memory serve to temporarily buffer data during such activities. Local volatile memory 142 can further be used to load, store and utilize metadata to track the locations and revision levels of various data sets stored in the array 132.

Figure 4:
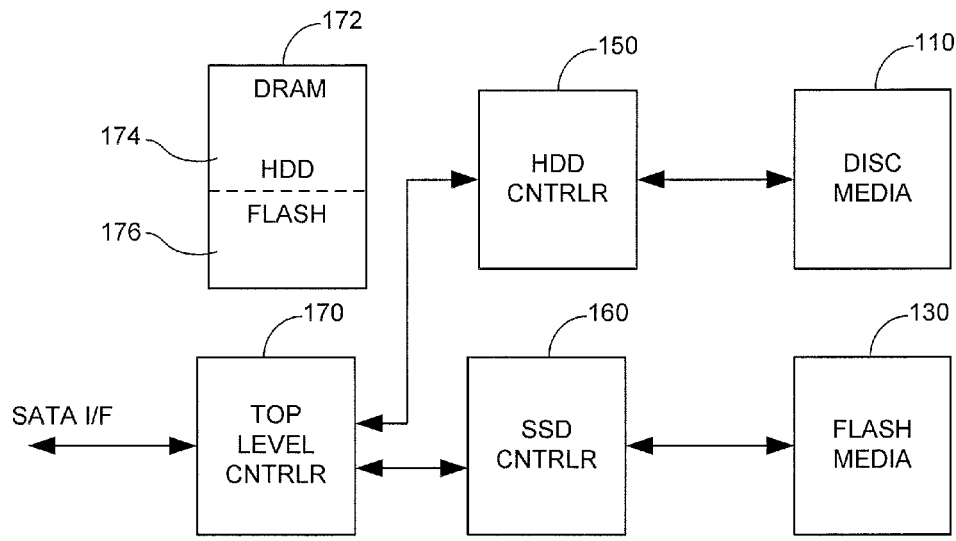
FIG. 4 shows an arrangement of the controller circuitry from FIG. 1 in accordance with some embodiments.

FIG. 4 provides a top level architecture for the device 100 in accordance with some embodiments. The disc media subsystem 110 from FIG. 2 is controlled by an HDD controller circuit 150, and the flash media subsystem 130 from FIG. 3 is controlled by an SSD controller circuit 160. Top level control of these controllers is in turn provided by a top level controller circuit 170. As mentioned above, these respective controller circuits are incorporated into the general controller 102 of FIG. 1 and may be variously realized as discussed above. It is contemplated albeit not necessarily required that these respective control circuits are physically realized as separate programmable processors or hardware processing circuits.

FIG. 4 further shows a local buffer memory (DRAM) 172. The DRAM is coupled to the respective controllers 150, 160 and 170 and is arranged to store user data during data transfer operations. The DRAM 172 may store other forms of data as well, including programming utilized by the various controllers, control parameters, metadata, state data, etc. The DRAM may be partitioned into separate sections, such as an HDD partition 174 for use by the HDD controller 150 and an SSD partition 176 for use by the SSD controller. Other arrangements can be used.

Without limitation, the architecture as shown in FIG. 4 can be characterized as an SSD with an attached auxiliary HDD subsection. That is, from an architectural standpoint, a primary data path is provided via the top level controller 170, SSD controller 160 and flash media 130. This is true even though the total data storage capacity of the flash media 130 is contemplated as being significantly smaller than the total data storage capacity of the disc media 110. In some embodiments, the flash capacity is less than about 5%, and more in the range of about 1-2%, of the disc capacity. This is not limiting, however, as any respective ratios of solid state memory capacity and rotatable storage data capacity can be accommodated by this embodiment.

Figure 5:
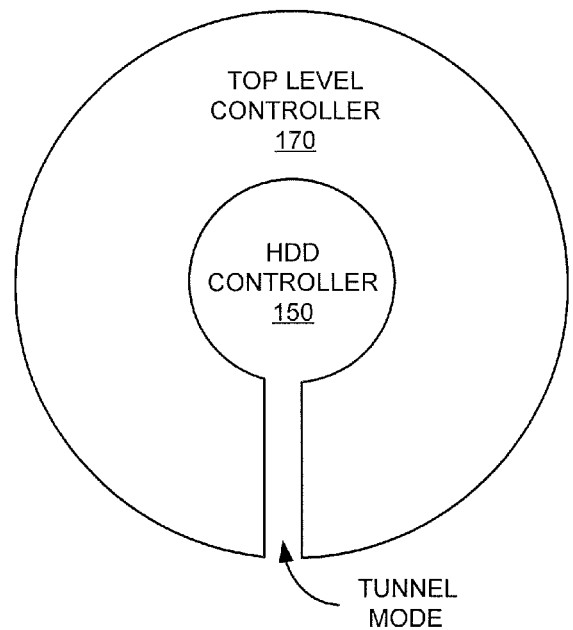
FIG. 5 is a schematic representation of respective normal modes and tunnel modes of operation of the hybrid device.

FIG. 5 is a schematic illustration to denote the relationship between the top level controller 170 and the HDD controller 150. It can be seen from the depiction in FIG. 5 that the top level controller 170 substantially surrounds and isolates the embedded HDD controller 150 from the host environment. This is in fact what happens during a normal mode of operation. During normal mode processing, access commands received by the top level controller 170 are initially evaluated by the top level controller 170 to determine the appropriate data path. Such access commands can include write commands to write data to the device 100, and read commands to read data from the device.

In the case of a write command from the host, the host will have requested to write certain write data to the device in non-volatile storage, and it is the responsibility of the top level controller 170 to determine whether the write data should be written to the disc media 110 or the flash media 130. If all received write data are simply forwarded to the disc media 110, then there is no need for the flash media 130 at all. On the other hand, all data sets that are written to the flash media 130 will need to be subsequently transferred to the disc media 110 as a backup copy. Therefore, the top level controller utilizes some measure of intelligence to decide, on a case by case basis, whether data should be written to disc or to flash. Factors that are used by the top level controller in making this decision will be discussed below.

In the case of data being written to disc, the top level controller 170 directs the access command to the HDD controller 150 and provides the necessary data values to enable the HDD controller to process the write operation and transfer the data from the DRAM 172 to the disc 112 (see FIGS. 2 and 4). In the case of data being read from the disc, the top level controller 170 similarly directs the read operation to the HDD controller 150, which in turn schedules the read operation, and recovers the data to the DRAM 172 (FIG. 4) for subsequent transfer to the requesting host.

At this point it should be noted that the HDD controller 150 is configured to operate as if it is directly connected to a host. Any number of host I/F protocols can be implemented in accordance with the present disclosure, including but not limited to SATA, SAS, Fibre Channel, Ethernet, ATA, etc. A SATA protocol will be contemplated to help facilitate the present discussion but such is not limiting. Thus, the top controller 170 operates to forward interrupts and other control data inputs to the HDD controller in such a way that the HDD controller operates identically in a manner as if the HDD controller were directly connected to, and communicating with, the host. One difference is that the top level controller 170 filters out data access commands from the host associated with data transfers that are carried out with the flash media 130. This improves the processing efficiency of the HDD controller; all access commands received by the HDD controller are immediately processed in accordance with the native functionality of the HDD controller and the HDD controller does not spend time trying to manage (or is aware of) the flash media 130.

It will be understood that during normal mode processing, similar decisions are made by the top level controller 170 for data sets that should be stored to or retrieved from the flash media 130. For those commands that should be processed by the flash media, such commands bypass the HDD controller and are instead passed to the SSD controller 160.

There is a special mode of operation, however, referred to herein as tunnel mode. During tunnel mode (or "tunneling" mode), the top level controller 170 is not involved, other than from a monitoring standpoint, to the data transfers. In tunnel mode, the top level controller 170 operates to connect the HDD controller 150 directly to the host device and does not pass through the top level controller 170, as is depicted in FIG. 5. From the standpoint of the HDD controller, there is essentially no difference between tunnel mode and normal mode other than minor differences with regard to where commands and status information are located.

An advantage of tunnel mode is that, for certain requests, it is more efficient that the HDD controller 150 communicate directly with the requesting host in carrying out the requested access commands rather than to occupy a portion of the processing capability of the top level controller 170 to emulate the host interaction. It is contemplated albeit not necessarily required that the switching between normal mode and tunneling mode will be carried out on a per-command basis; that is, some commands will be arranged in such a way that normal mode processing is enacted. Other commands, such as sequential access commands for large set of data, may be assigned to tunnel mode. It will thus be understood that the terms normal mode and tunnel mode are assigned to individual data access commands rather than to blocks of time; that is, the device 100 does not enter tunnel mode, then normal mode, then back to tunnel mode, and so on based on elapsed time. Rather, the device 100 may be operating in both tunnel mode and in normal mode concurrently for different commands.

This does not preclude the device from electing, at certain times, from entering tunnel mode for a particular period of time so that all commands received during that time period are serviced using the disc. For example, all write commands can be configured to sequentially write all input write data to a media cache as a specially configured zone on one or more disc surfaces from which the data may be subsequently migrated later to other final locations on the disc surfaces, etc. All read commands can be serviced from either DRAM (as cache hits) or from disc (since all cleaned data should be resident on the discs).

Figure 6:
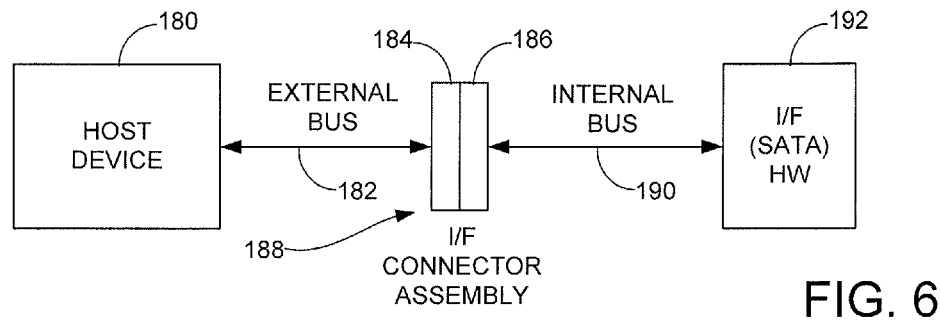
FIG. 6 depicts connection of the hybrid device to an external host device.

FIG. 6 is a functional block diagram to provide additional details regarding the operational environment of the data storage device 100 in some embodiments. A host device is depicted at 180. The host device 180 can take any number of forms depending on the requirements of a given application. In some embodiments, the host device 180 can be computer, laptop, tablet, smart phone, game console, or other physical device with a hardware and/or programmable processor with associated memory and circuitry configured to issue data access commands to the device 100 to store and retrieve user data.

The host device 180 communicates, from a physical standpoint, via a bus connection (external bus) 182 to a host bus connector 184. The bus connection may comprise multiple parallel signal paths to facilitate communication of data, status and commands to the host device as is well known in the art. The host bus connector 184 may be a multi-pin connector, a slot, etc. A device connector 186 physically interconnects with the host bus connector 184 to form an I/F (interface) connector assembly 188, such as by plugging into a motherboard of the host device, a midplane connection, etc.

Regardless, data and control signals forwarded by the external bus 182 are passed along an internal bus 190 to an interface hardware circuit 192. The circuit 192 is denoted as I/F (SATA) HW (hardware), which represents a hardware circuit of the hybrid device 100 designed to receive and interpret commands and data received from the bus 182. Commands are routed to an appropriate memory location for attention by the top level controller 170, and data may be routed to the DRAM 172 (see FIG. 4). As noted above, SATA interface protocol is contemplated for the present discussion, but any suitable protocol including but not limited to ATA, SAS, Ethernet, Fibre Channel, etc. can be utilized as desired.

Figure 7A:
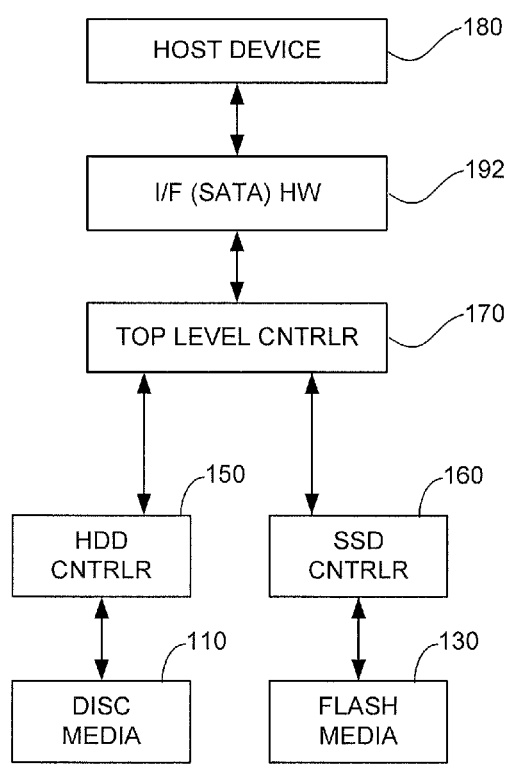
FIGS. 7A and 7B show respective data flows for the normal and tunnel modes of operation.
Figure 7B:
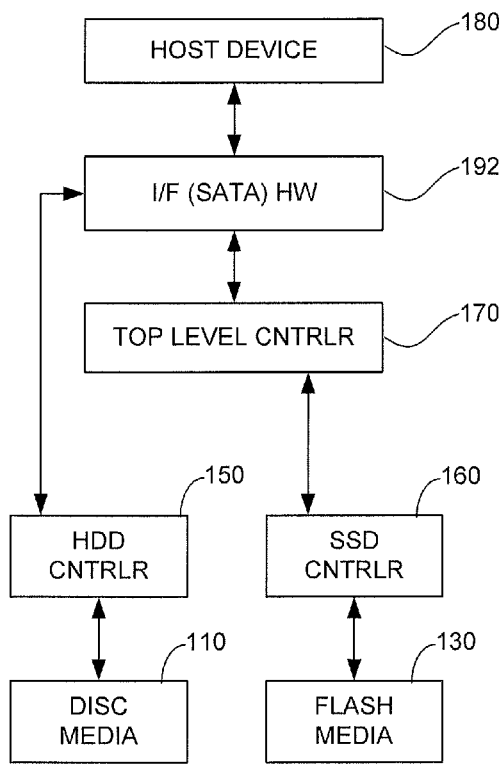

FIGS. 7A and 7B denote data flows associated with the respective normal and tunnel modes of operation discussed above. During normal mode, as shown in FIG. 7A, data transfer requests originate with the host device 180 and are transferred, as shown in FIG. 6, to the I/F (SATA) HW 192. The circuit 192 passes or otherwise notifies the top level controller 170 of the receipt of the associated command. The top level controller 170 operates to decide whether the received command should be handled by the disc media 110 or the flash media 130. The decision on whether to service the command based on these different forms of media makes up a significant portion of the overall functionality responsibilities of this circuit.

As known in the art, the decision whether a certain access command should be handled by the disc or flash depends on a variety of factors. It will be helpful to separate the types of commands between write commands, in which data are written to the device 100, and read commands, in which data are read from the device 100.

In the case of a write command, the status and form of the write data can be utilized in deciding where to write the data. Current workloads and other factors may be taken into account when writing the data, as well as avoiding unnecessary wear on the solid state memory. Sequential writes may make more sense to pass to the disc. Adjacent data in terms of logical addressing (such as logical block addresses, LBAS) already stored in the flash 130 may be also stored in the flash to facilitate faster subsequent read performance.

A write strategy may be implemented by the top level controller 170 to determine a target location for the write data. Whether write back caching has been implemented (e.g., a write complete status is issued prior to the actual writing of the data to non-volatile memory) can also be a factor. High priority data may be written to the flash to ensure the data are stored as quickly as possible into non-volatile memory, while other data may be scheduled for normal writing to disc. Protocols may be implemented as known in the art such that all pending data, in the event of an unscheduled power interruption event, are flushed to non-volatile memory, either flash or the disc.

Read operations are handled in similar fashion during normal mode. One difference between read and write operations is the time spent by the top level controller 170 in ascertaining where the requested read data are located. On the one hand, depending on the device configuration, all requested read data will have been stored, and is resident on the disc media 110, and so one strategy could be to simply issue all read requests to the disc media. However, should a particular set of data requested by the host already be resident in the DRAM 172 (FIG. 4) or in the flash 130, it would be more efficient to recover such data from these locations rather than to issue a read request from the disc 110.

Accordingly, it is contemplated that the top level controller 170 searches associated data structures that indicate the contents of the respective flash media 130 and DRAM 172 to ascertain whether the requested data are resident therein. If so, the commands are satisfied therefrom rather than issuing a request for the data from the disc media 110 in order to provide a low cost cache hit. In one embodiment, cache status is only maintained for the HDD partition 174 of the DRAM 172, since it is easier to simply recover the data from the flash media 130 rather than track the contents of the SSD portion of the DRAM 172.

Thus, for a read operation the top level controller 170 may first search the flash media 130 (using the associated metadata, see FIG. 3) to see if the requested data are stored therein. If not, the top level controller 170 may next search the DRAM 172 in an effort to locate the requested data. If not, a read request is issued to the HDD controller 150. Any number of suitable data structures can be used as known in the art to identify the contents of the flash media 130 and the DRAM 172 including forward pointing linked lists, table structures, etc.

Tunnel mode operation is generally represented by FIG. 7B. During tunnel mode, writes to the flash media 130 and cache hit reads are handled in the same manner discussed above. However, certain types of data writes and reads may be determined by the top level controller 170 as being more efficiently handled by the HDD controller 150 directly without intervention by the top level controller. Accordingly, as shown by FIG. 7B, such commands bypass the top level controller 170 so that the I/F (SATA) HW circuit 192 interacts directly with the HDD controller 150 to satisfy such commands.

Figure 8:
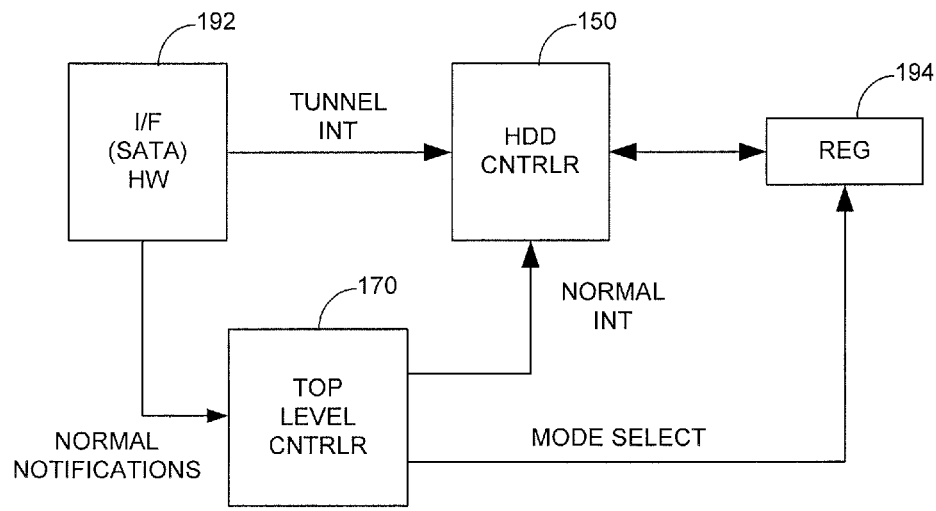
FIG. 8 is a functional block representation of selection circuitry utilized by the hybrid device to switch between the respective normal and tunnel modes.

FIG. 8 shows one arrangement in which tunnel mode can be implemented. Depending on the protocol (e.g., SATA, etc.), commands may be handled through the use of interrupts (INT) that are issued from time to time to cause the associated controller to take note of, and process, the associated commands. As shown in FIG. 8, during normal mode of operation, the I/F (SATA) HW 192 provides normal notifications to the top level controller 170 of received access commands from the host device (see FIG. 6). In response, the top level controller 170 issues a corresponding interrupt (INT) signal to a selected pin of the HDD controller 150. Based on the receipt of this interrupt input, the HDD controller accesses the command, such as from the I/F circuit 192, the top level controller 170, or some other suitable location and processes it accordingly. It will be noted that only those commands to be processed by the HDD controller 150 result in the issuance of an interrupt by the top level controller 170. Other commands that wind up being passed to the flash media 130 are not noted by, or acted upon, by the HDD controller 150.

At such time that the top level controller 170 determines to place the HDD controller in tunnel mode, a mode select signal is passed along an appropriate pathway to a register (REG) 194 which sets one or more flag bits for access by the HDD controller 150. Based on the status of these flag bits, the HDD controller 150 may look to different register locations for the command and may place the status and command complete information in a different location. In this way, the HDD controller 150 can rely on command interrupts issued by the I/F (SATA) HW circuit 192 and communicate with the host directly as discussed above. The HDD controller 150 can be configured (via hardware or programming) to scan the register 194 periodically and, in response to the status of the register, look to different interrupts on different input pins to service the associated commands. The top level controller 170 can monitor the operation of the HDD controller 150 to ensure that a given command has been transferred to tunnel mode and then modify the register status accordingly. The top level controller 170 can further monitor the operation of the HDD controller 150 in tunnel mode to ensure that the command has been received, serviced and completed using easily implemented techniques in view of the present discussion.

Figure 9:
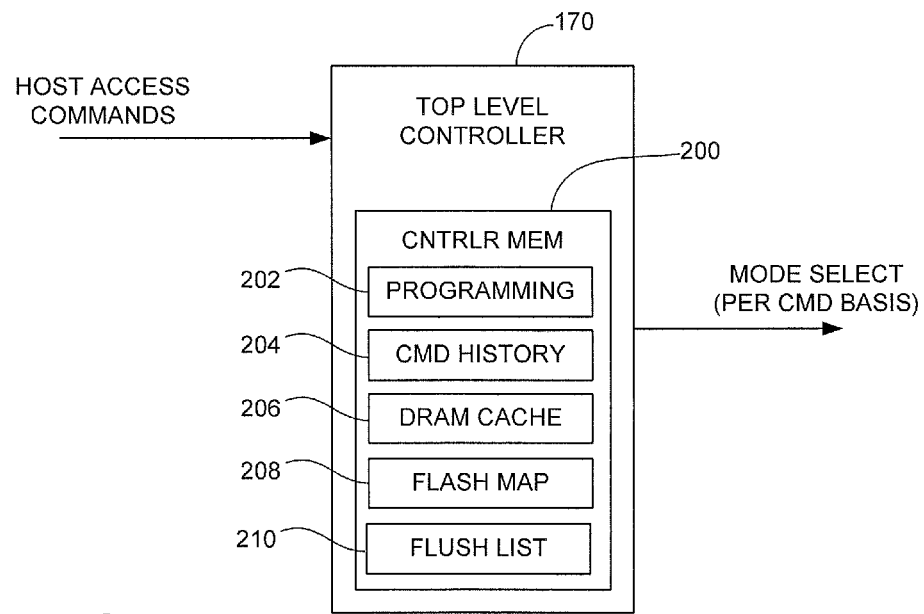
FIG. 9 shows the top level controller of FIG. 4 in further embodiments.

FIG. 9 shows a functional block diagram of the top level controller 170 in accordance with further embodiments. All host access commands received by the host are received and evaluated by the top level controller 170. In those embodiments in which the top level controller is a programmable processor, controller memory 200 is provided that stores a number of software programming and data modules, including a programming set 202 representative of executable programming instructions carried out by the processor of the top level controller; a command history table 204 indicative of recently received commands; a DRAM cache map 206 indicative of at least a map of the data stored in the HDD partition 174 (see FIG. 4); a flash map 208 indicative of the data (e.g., on an LBA basis) stored in the flash media 130; and a flush list list 210 indicative of data sets that need to be flushed from the flash media 130 to the disc media 110.

The command history table 204 provides a recent history of commands received by the device 100. This can be used to detect hot data sets that should be migrated to and maintained in the flash memory 130, to provide caching retention strategies for the DRAM, as well as to detect sequential data transfers that might signify a data throughput enhancement through the enactment of tunnel mode.

The DRAM cache map 206 indicates the data stored in DRAM 172, whether just the HDD partition 174 or the entire memory. The flash map 208 indicates what data sets are currently stored in the flash media 130, and the flush list 210 identifies data sets currently stored in the flash media 130 that require transfer of at least a backup copy to the disc media 130.

Based on these and other factors, including sequential read/write requests on an LBA basis, the top level controller may elect to implement tunnel mode to improve processing efficiency.

Figure 10:
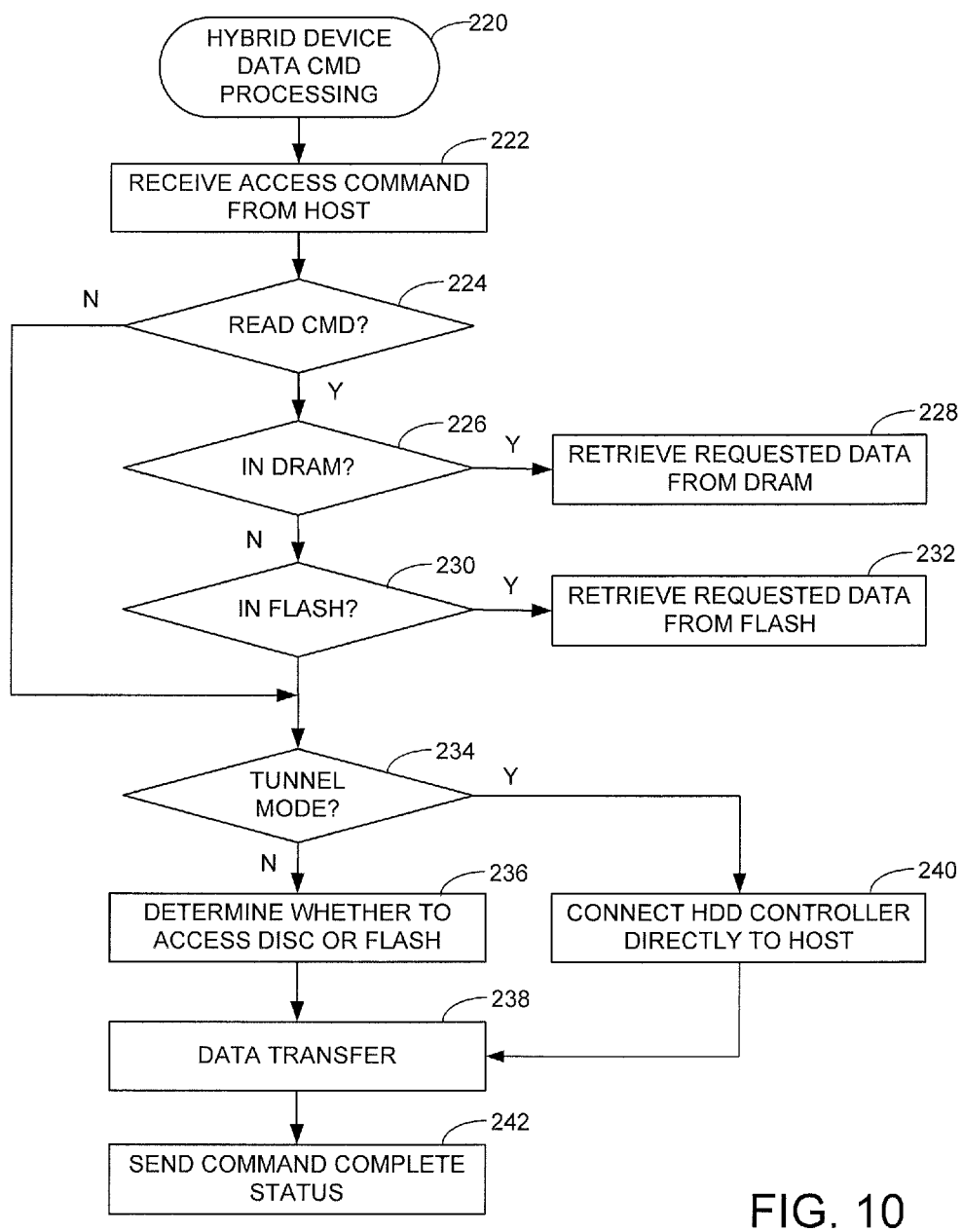
FIG. 10 is a generalized flow chart for a hybrid device data command (CMD) processing routine illustrative of steps carried out in accordance with some embodiments.

FIG. 10 is a flow chart for a hybrid device data command (CMD) processing routine 220 illustrative of steps carried out in accordance with the foregoing discussion. It will be understood that the steps shown in FIG. 10 are merely exemplary and are not limiting, and various other steps may be added or appended as required, and the various steps shown may be omitted, modified, carried out in a different order, etc. It is contemplated albeit not required that the steps shown in FIG. 10 may correspond to programming steps implemented, via suitable programming stored in memory, for the top level controller 170.

At step 232, an access command is received from a host device coupled to a hybrid device, such as the host device 180 shown in FIG. 6 and the exemplary hybrid device 100.

Decision step 234 determines whether the received host access command is a read command. If so, the flow proceeds to step 226 which determines whether the requested data associated with the read command is located in the DRAM 172. As discussed above, this can be carried out including by consulting, by the top level controller 170, a table structure stored in an appropriate memory location, including but not limited to the DRAM 172, that maps the contents of the stored memory on an LBA or other logical block basis.

At such time that the requested data are found to be resident in the DRAM 172, the flow passes to step 228 where the data are retrieved therefrom and returned to the host.

The process continues at step 230 where it is determined whether the data, if not in the DRAM, is located in the flash memory 130. If so, the requested data are retrieved and transferred. This can include a forwarding of the access command by the top level controller 170 to the SSD controller 160, which in turn issues a read command to the local flash media 130 (as shown in FIG. 2) to retrieve the requested data to the DRAM and from there to the host. In some embodiments, the data may be loaded to an available space within the SSD partition 176 (FIG. 4) pending transfer to the requesting host. In some cases, even if the data are already resident in the DRAM, it may be deemed to be more efficient to proceed with satisfying the read request from the flash.

In such cases where either the received access command is a write command, or the received access command is a read command that cannot be immediately serviced by a cache hit from either the flash memory or the DRAM, the flow continues to step 234 where the top level controller circuit 170 determines whether the access command should be serviced using normal mode or tunnel mode.

As discussed above, a variety of factors can be used to decide whether a particular command, or set of commands, should be serviced using normal mode or tunnel mode. These factors can include, but are not limited to, the logical addresses of the commands, the workload currently being experienced by the device, the contents of the DRAM and/or the flash, or other factors pertinent to the evaluation. Generally, tunnel mode makes sense in cases where the additional overhead processing by the top level controller adds little value to the overall flow of data through the system. Sequential writes and reads, where large blocks of data are transferred between the host and the HDD controller to the disc media, are some examples where tunnel mode processing would tend to promote increased data transfer rates by the device. Other conditions will readily occur to the skilled artisan.

Regardless, if tunnel mode is not selected, the flow passes from step 234 to step 236 where the top level controller 170 determines whether the data should be stored in, or retrieved from, the disc media 110 or the flash media 130. Based on the flow of FIG. 10, it can be seen that if the access command is a read command and a check has already been made whether the data are resident in the flash media and, if not, it follows that the read command should be forwarded to the HDD controller to retrieve the requested data from disc. In the case of a write command, however, it is up to the top level controller 170 to determine whether the input data should be written to disc or to the flash memory. The factors discussed above can be used in this determination.

Generally, if the data appear to be relatively high interest (e.g. hot) data, or if nearby LBAs are already stored in the flash memory, the top level controller 170 may operate to proceed to direct storage in the flash memory 130. Otherwise, the top level controller may direct storage in the disc media 110. Either way, once the decision is made, the access command is forwarded to the appropriate controller 150, 160 for storage in the associated memory 110, 130.

Continuing with FIG. 10, should tunnel mode be implemented for a particular command or set of commands, the flow continues to step 240 where the HDD controller is connected directly to the host for execution of the associated command(s). For example, should the top level processor 170 detect over time a sequential read/write operation involving a relatively large amount of data, the top level processor 170 may implement tunnel mode and have the HDD controller 150 take over and manage the data transfer. As will be recognized by those skilled in the art, rotatable storage such as the disc 112 (FIG. 2) are highly efficient in the transfer of large blocks of streamed data.

The bases upon which the tunnel mode of operation can be selected can vary depending on the requirements of a given application. In addition to those discussed above, some considerations that can influence the triggering of tunnel mode can include whether the drive receives a long command and all of the entire extent of the command is to/from the discs; whether there is a sequence of write commands that are all spatially located in the same area of the discs, in which case it may be more beneficial to access the discs directly; and whether a new command received is determined to be spatially close to the last disc access.

In some implementations, control may be given from time to time by the data storage device to the host device to direct what data are stored to flash and what data are stored to the discs. In this case, disc-directed commands may be handled such that the commands are processed using tunnel mode.

From the foregoing discussion it will now be appreciated that the foregoing embodiments provide a number of advantages over the existing art. Hybrid devices provide certain unique challenges in that a relatively small amount of local solid state memory is available to enhance the data transfer requirements of a hybrid device. Storing relatively high priority data in the local solid state memory has the capability of enhancing data transfer rates, both from a standpoint of cache hits in the local solid state memory (or the local DRAM or other buffer memory) as well as faster and more reliable writing of input write data to non-volatile memory.

By intelligently selecting the use of the so-called tunnel mode, certain data access streams, such as those involving sequential accesses, can be offloaded to the associated HDD controller to both promote improved efficiency in the execution of such commands as well as offloading processing functions associated with the concurrent storage of data to the local solid state memory (e.g., flash).

Those skilled in the art will appreciate that the various embodiments disclosed herein can be particularly suitable for efficient data transfers using certain interface protocols. For example, most SATA commands comprise three (3) phases or elements: command, data transfer (if any) and status. The amount of interaction between the normal disc drive firmware and the SATA interface hardware in order to perform these three phases can be extensive. In addition, there are several so-called "special" commands that have been added to the SATA command set that do not follow this protocol.

Because of this, it can be quite complicated to have the outer (top level) processor insert itself in between all of the actions involving the drive firmware and the SATA hardware, since this may require a significant amount of unnecessary processing overhead on the part of the outer process. The tunnel mode concept, as embodied herein, simplifies this approach. For any command that exclusively uses the disc media (e.g., requires no flash interactions), the outer processor can operate to place that command into tunnel mode. This mode signals to both the disc drive firmware and the outer processor that the disc drive firmware will be directly interacting with the SATA hardware and to ignore the outer processor as much as possible. Because a vast majority of these special commands require no interaction with the flash layer, enhanced processing efficiencies at all controller levels (top level, HDD and SSD) can be achieved.

While rotatable magnetic recording discs have been utilized in the foregoing examples as one type of rotatable storage disc, other forms of rotatable storage, including but not limited to optical discs, magneto-optical discs, etc. can be used as desired. Similarly, while flash memory has been used as an exemplary form of solid state memory for the exemplary hybrid storage device 100, other forms of non-volatile semiconductor memory, such as but not limited to spin-torque transfer random access memory (STRAM), resistive random access memory (RRAM), phase change random access memory (PCRAM), programmable logic cells (PLCs), and other form of memory, whether erasable or rewriteable, can be used as desired.

The various embodiments presented herein have contemplated a hybrid storage device in which the main, slower memory is a rotatable media memory (e.g., rotatable magnetic recording discs) and the auxiliary, faster memory is a solid state memory (e.g., flash memory). This is merely exemplary and is not necessarily limiting. Other embodiments can use any suitable combination of respective memories, including but not limited to applications where the slower main memory is a first form of solid state memory (e.g., erasable flash memory, etc.) and the faster auxiliary memory is a different, second form of solid state memory (e.g., rewritable STRAM, RRAM, PCRAM, PLCs, etc.). In such case, there may be a benefit to use the top level controller circuit to emulate interfaces with the main memory (e.g., the flash memory in this example) and initiate tunneling mode from time to time to allow direct accesses using the flash controller in a manner generally set forth above.

This would provide benefits consonant with those discussed above. It is noted, for example, that erasable memories such as flash memory are subjected to periodic garbage collection operations since each subsequent version of a set of data generally needs to be written to a new location, and metadata structures are usually employed to direct the system, such as via forward pointers, to the location of the latest version. Rewritable memories, on the other hand, can be overwritten with existing data and therefore may provide more efficient access, retrieval and management systems.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A hybrid data storage device comprising:
   a hard disc drive (HDD) controller circuit coupled to non-volatile rotatable media;
   a solid state drive (SSD) controller circuit coupled to non-volatile solid state memory;
   a volatile memory respectively coupled to the HDD and SSD controller circuits to respectively cache data associated with the rotatable median and the solid state memory; and
   a top level controller circuit operably coupled to an interface connector of the hybrid data storage device and configured to, during a normal mode of operation, direct a selected access command received from a host device through the interface connector to a selected one of the HDD controller circuit or the SSD controller circuit responsive to a selected parameter associated with the selected access command, the top level controller circuit operative in the normal mode to generate an interrupt for attention by the HDD controller circuit responsive to the selected access command and to return, to the host device, a command complete notification responsive to a controller level notification by the HDD controller circuit that the selected access command has been completed, the top level controller further configured to, during a tunnel mode of operation, connect the HDD controller circuit directly to the host device without intervention by the top level controller to transfer data between the host device and the HDD controller circuit responsive to the selected access command so that the HDD controller circuit communicates the command complete notification directly to the host device responsive to a completion of the selected access command by the HDD controller circuit, the top level controller circuit selecting between the normal mode and the tunnel mode responsive to the selected parameter associated with the selected access command.

2. The hybrid data storage device of claim 1, wherein the rotatable media comprises a magnetic recording disc.

3. The hybrid data storage device of claim 1, wherein the solid state memory comprises a flash memory array.

4. The hybrid data storage device of claim 1, wherein the local controller circuit emulates communications between the host device and the HDD controller circuit during the normal mode of operation.

5. The hybrid data storage device of claim 1, wherein the local volatile memory is a dynamic random access memory (DRAM).

6. The hybrid data storage device of claim 5, wherein the local volatile memory is partitioned into a first partition accessible only by the HDD controller circuit and a second partition accessible only by the SSD controller circuit.

7. The hybrid data storage device of claim 1, wherein the interrupt signal is a normal mode interrupt signal and during the normal mode of operation the top level controller circuit provides the normal mode interrupt signal to a first memory location accessible by the HDD controller circuit responsive to receipt of the selected access command from the host device and the HDD controller circuit services the selected access command responsive to the normal mode interrupt signal from the top level controller and provides the controller level notification to the top level controller responsive to the completion of the selected access command.

8. The hybrid data storage device of claim 7, wherein during the tunnel mode of operation an interface circuit provides a tunnel mode interrupt signal to a different, second location accessible by the HDD controller circuit responsive to receipt of the selected access command from the host device, the top level controller circuit sets a flag value in a local register, and the HDD controller circuit services the selected access command and provides the command complete notification to the host device responsive to the interrupt signal from the interface circuit and the flag value in the local register.

9. The hybrid data storage device of claim 1, wherein responsive to a read access command from the host device, the top level controller circuit searches a map structure associated with data stored in the solid state memory to facilitate a cache hit from the solid state memory, and if requested data associated with the read access command are not stored in the solid state memory the top level controller circuit subsequently searches a second map structure associated with data stored in a local volatile memory to facilitate a cache hit therefrom, and if the requested data are not located in the local volatile memory the top level controller circuit operates to select one of the normal mode of operation or the tunnel mode of operation for execution of the selected access command.

10. The hybrid data storage device of claim 1, wherein the top level controller circuit selects the normal mode of operation or the tunnel mode of operation responsive to another data set stored in the solid state memory having a logical address associated with a logical address of the selected access command.

11. The hybrid data storage device of claim 1, wherein the top level controller circuit selects the tunnel mode of operation responsive to the selected access command being detected as part of a streamed write data sequence of data blocks having sequential logical addresses.

12. The hybrid data storage device of claim 1, wherein the rotatable media comprises a rotatable magnetic recording disc, a data read/write transducer movable with respect to the rotatable magnetic recording disc, a read/write channel circuit coupled to the data read/write transducer to process data signals during write and read operations, and a servo control circuit configured to position the data read/write transducer relative to data tracks defined on a recording surface of the magnetic recording disc, and wherein the solid state memory comprises an array of erasable flash memory cells arranged into erasure blocks, a read/write/erasure control circuit configured to read, write and erase selected flash memory cells, and a local buffer memory configured to temporarily store user data during read, write and erasure operations.

13. A hybrid data storage device, comprising:
a rotatable media subsystem comprising a rotatable magnetic recording disc, a data read/write transducer movable with respect to the rotatable magnetic recording disc, a read/write channel circuit coupled to the data read/write transducer to process data signals during write and read operations, and a servo control circuit configured to position the data read/write transducer relative to data tracks defined on a recording surface of the magnetic recording disc;
a flash memory subsystem comprising an array of erasable flash memory cells arranged into erasure blocks, a read/write/erasure control circuit configured to read, write and erase selected flash memory cells, and a local buffer memory configured to temporarily store user data during read, write and erasure operations;
a hard disc drive (HDD) controller circuit coupled to the rotatable media subsystem;
a solid state drive (SSD) controller circuit coupled to the flash memory subsystem;
a volatile memory coupled to the HDD and SSD controller circuits to respectively cache data associated with the rotatable median and the solid state memory; and
a top level controller circuit operably coupled to an interface connector of the hybrid data storage device and configured to receive a plurality of access commands from a host device through the interface connector and to select one of a normal mode of operation or a tunneling mode of operation for each of the access commands responsive to a selected parameter associated with each access command, the top level controller circuit operative to forward a first portion of the access commands associated with the normal mode of operation to the HDD controller circuit and to forward a second portion of the access commands associated with the normal mode of operation to the SSD controller circuit, the top level controller circuit further operative to connect the HDD controller circuit directly to the host device without intervention by the top level controller to transfer data between the host device and the HDD controller circuit for a third portion of the access commands associated with the tunneling mode of operation so that the HDD controller circuit concurrently processes the second and third portions of the access commands.

14. The hybrid data storage device of claim 13, wherein for each selected access command in the second portion the top level controller circuit provides an interrupt signal to a first selected pin of the HDD controller circuit responsive to receipt of the selected access command from the host device and the HDD controller circuit services the selected access command responsive to the interrupt signal from the top level controller.

15. The hybrid data storage device of claim 14, wherein for each selected access command in the third portion an interface circuit provides an interrupt signal to a different, second selected pin of the HDD controller circuit responsive to receipt of the selected access command in the third portion from the host device, the top level controller circuit sets a flag value in a local register, and the HDD controller circuit services the selected access command in the third portion responsive to the interrupt signal from the interface circuit and the flag value in the local register.

16. The hybrid data storage device of claim 13, wherein responsive to a read access command from the host device, the top level controller circuit searches a map structure associated with data stored in the solid state memory to facilitate a cache hit from the solid state memory, and if requested data associated with the read access command are not stored in the solid state memory the top level controller circuit subsequently searches a second map structure associated with data stored in a local volatile memory to facilitate a cache hit therefrom, and if the requested data are not located in the local volatile memory the top level controller circuit operates to select one of the normal mode of operation or the tunnel mode for execution of the selected access command.

17. A method comprising:
receiving an access command from a host device to access data in a hybrid data storage device comprising non-volatile rotatable media and non-volatile solid state media;
identifying the non-volatile rotatable media as a destination for data associated with the access command;
selecting one of a normal mode of operation or a tunnel mode of operation for the servicing of the access command;
using a top level controller during the normal mode of operation to coordinate the transfer of the data associated with the access command by issuing a first interrupt signal to a hard disc drive (HDD) controller circuit coupled to the non-volatile rotatable media and forwarding a command complete signal to the host device from the HDD controller circuit; and
offloading the access command from the top level controller during the tunnel mode of operation so that an interface circuit issues a different, second interrupt signal to the HDD controller circuit and the HDD controller circuit bypasses the top level controller by forwarding the command complete signal to the interface circuit for transfer to the host device.

18. The method of claim 17, wherein during the normal mode of operation the top level controller circuit provides the first interrupt signal to a first location to facilitate servicing of the access command by the HDD controller, and wherein during the tunnel mode of operation the interface circuit provides the second interrupt signal to a different, second location.

19. The method of claim 17, wherein the access command is a first access command identified for processing by the HDD controller circuit using the normal mode of operation, and wherein the method further comprises using the HDD controller circuit to concurrently process a second access command using the tunnel mode of operation.

20. The method of claim 19, further comprising concurrently processing a third access command during the processing of the first and second access commands by using the top level controller to forward the third access command to a solid state drive (SSD) controller coupled to the non-volatile solid state memory for storage thereto.

* * * * *